(12) United States Patent
Dustin et al.

(10) Patent No.: US 11,655,344 B2
(45) Date of Patent: *May 23, 2023

(54) ORGANOGEL COMPOSITIONS INCLUDING FUNCTIONAL ADDITIVES AND METHODS FOR THE SAME

(71) Applicant: The Boeing Company, Chicago, IL (US)

(72) Inventors: Ashley M. Dustin, Los Angeles, CA (US); Andrew P. Nowak, Los Angeles, CA (US); Xin Ning Guan, Monterey Park, CA (US); Carissa A. Pajel, Mercer Island, WA (US); Darrin M. Hansen, Seattle, WA (US); Melinda D. Miller, Snohomish, WA (US); Jesse R. Wiseman, Snohomish, WA (US)

(73) Assignee: THE BOEING COMPANY, Arlington, VA (US)

( * ) Notice: Subject to any disclaimer, the term of this patent is extended or adjusted under 35 U.S.C. 154(b) by 114 days.

This patent is subject to a terminal disclaimer.

(21) Appl. No.: 17/165,706

(22) Filed: Feb. 2, 2021

(65) Prior Publication Data

US 2021/0155761 A1    May 27, 2021

Related U.S. Application Data

(63) Continuation of application No. 16/513,275, filed on Jul. 16, 2019, now Pat. No. 10,941,256.

(51) Int. Cl.

| | | |
|---|---|---|
| *C08F 20/20* | (2006.01) | |
| *C09D 4/00* | (2006.01) | |
| *C09D 133/08* | (2006.01) | |
| *C09D 133/10* | (2006.01) | |
| *C08J 3/09* | (2006.01) | |
| *C08J 3/205* | (2006.01) | |
| *C08K 3/40* | (2006.01) | |
| *C08K 3/34* | (2006.01) | |

(52) U.S. Cl.
CPC .............. *C08J 3/095* (2013.01); *C08F 20/20* (2013.01); *C08J 3/205* (2013.01); *C08K 3/40* (2013.01); *C09D 4/00* (2013.01); *C08J 2333/14* (2013.01); *C08K 3/34* (2013.01); *C09D 133/08* (2013.01); *C09D 133/10* (2013.01)

(58) Field of Classification Search
None
See application file for complete search history.

(56) References Cited

U.S. PATENT DOCUMENTS

| | | | |
|---|---|---|---|
| 3,645,816 A | 2/1972 | Billias et al. | |
| 6,426,034 B1 | 7/2002 | McComas et al. | |
| 6,869,981 B2 | 3/2005 | Fewkes et al. | |
| 7,524,564 B2 | 4/2009 | Cosman | |
| 10,941,256 B2 * | 3/2021 | Dustin ............... | C09D 4/00 |
| 2011/0226271 A1 | 9/2011 | Raney et al. | |
| 2015/0158969 A1 | 6/2015 | Nowak | |
| 2017/0369752 A1 | 12/2017 | Stevens et al. | |

FOREIGN PATENT DOCUMENTS

| | | |
|---|---|---|
| CN | 108081159 A | 5/2018 |
| CN | 109638344 A | 4/2019 |
| JP | 2003241465 A | 8/2003 |
| WO | 2019/083855 A1 | 5/2019 |

OTHER PUBLICATIONS

Kim, Y. et al., "Fabrication of a fluorescent sensor by organogelation: CdSe/ZnSquantum dots embedded molecularly imprinted organogel nanofibers". Sensors and Actuators B Chemical 2016, 234, 122-129. (Year: 2016).*

Rivas-Orta et al., "Synthesis and characterization or organogel from poly(acrylic acid) with cellulose acetate," e-Polymers, 2010, No. 144, pp. 1-9.

Baglioni et al., "Organogel formulations for the cleaning of easel paintings," Appl. Phys. A (2015) 121:857-868.

Pianorsi et al., "Organogels for the cleaning of artifacts," De Gruyter Pure Appl. Chem. 2017; 89(1):3-17.

Extended European Search Report dated Nov. 12, 2020 in corresponding European Application No. 20185361.1, 11 pages.

Kim et al., "Fabrication of a fluorescent sensor by organogelation: CdSe/ZnS quantum dots embedded molecularly imprinted organogel nanofibers," Sensors and Actuators B 234 (2016) 122-129.

Kim et al., "High performance flexible double-sided micro-supercapacitors with an organic gel electrolyte containing a redox-active additive," Nanoscale, 2016, 8, 15611 (10 pages).

Liu et al., "Organogel-based thin films for self-cleaning on various surfaces," Advanced Materials, 2013, 25, 4477-4481.

* cited by examiner

*Primary Examiner* — Richard A Huhn
(74) *Attorney, Agent, or Firm* — MH2 Technology Law Group LLP

(57) ABSTRACT

An organogel composition and methods for preparing the organogel composition and preparing a surface with the organogel composition are disclosed. The organogel composition can include one or more organic solvents, one or more acrylates, and one or more functional additives. The method for preparing the organogel composition can include contacting the one or more organic solvents, the one or more acrylates, and the one or more functional additives with one another to prepare the organogel composition, and homogenizing the organogel composition to modify a shear viscosity of the organogel composition.

20 Claims, No Drawings

ORGANOGEL COMPOSITIONS INCLUDING FUNCTIONAL ADDITIVES AND METHODS FOR THE SAME

RELATED APPLICATIONS

This application is a continuation of and claims priority to U.S. patent application Ser. No. 16/513,275, filed Jul. 16, 2019 (now allowed), the disclosure of which is hereby incorporated herein by reference in its entirety.

TECHNICAL FIELD

The present disclosure generally relates to the field of sealants. More particularly, the present disclosure relates to compositions for preparing a surface or substrate (e.g., surface of a fuel tank for aerospace vehicle) for subsequent application of polymeric materials, such as polysulfide sealants.

BACKGROUND

Sealants play a vital role in the successful assembly of various aircraft components and see widespread use in both manufacturing and maintenance. In particular, sealants are used extensively in fuel tank applications to both fill and adhere seal caps or to be applied directly on the aircraft structure as fillet seals. For example, commercial aircrafts that store fuel in wings and/or tanks located between the wings do not rely on bladders or liners to contain the fuel. Instead, the commercial aircrafts rely on the metallic or composite skin of the aircrafts to contain the fuel. As a result, joints and bolts must be properly sealed to eliminate fuel leakage, mitigate corrosion potential, and protect against arcing electrical discharge in the fuel storage in the event of a lightning strike.

Conventional application of the sealant at or around the area of the joints and bolts includes cleaning the area with a solvent and subsequent application of an adhesion promoter, such as a Class A material (e.g., Class A polysulfide sealant, brushable sealant, etc.). After application of the adhesion promoter, a thioxotropic sealant (e.g., a Class B polysulfide sealant) can be applied and allowed to cure to complete the sealing system. The curing of the sealing system is often a lengthy process (e.g., up to 24 hours or more) that slows aircraft production and maintenance efficiencies.

What is needed, then, are improved compositions for preparing a surface for a sealant and methods for preparing and utilizing the improved compositions.

SUMMARY

The following presents a simplified summary in order to provide a basic understanding of some aspects of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

Examples of the disclosure provide an organogel composition including one or more organic solvents, one or more acrylates, and one or more functional additives. The one or more acrylates can include one or more acrylate monomers. The one or more acrylates can include polybutadiene dimethyacrylate, pentaerythritol tetraacrylate, polyethylene glycol diacrylate, or combinations thereof. The one or more organic solvents can include an aliphatic hydrocarbon, an aromatic compound, a ketone, an amine, an ester, an alcohol, an aldehyde, an ether, or combinations thereof. The one or more organic solvents can include a ketone organic solvent. The ketone may include acetone, methyl ethyl ketone (MEK), diethyl ketone, methyl propyl ketone (MPK), dipropyl ketone, methyl isobutyl ketone (MIBK), cyclopentanone, cyclohexanone, methyl amyl ketone, n-methyl-2-pyrrolidone, diisobutyl ketone, acetophenone, or combinations thereof. The ketone can include methyl ethyl ketone (MEK), methyl propyl ketone (MPK), methyl isobutyl ketone (MIBK), acetone, or combinations thereof. The one or more organic solvents can include the ester, and the ester can include ethyl acetate, n-butyl acetate, or combinations thereof. The one or more functional additives can include an adhesion promoter, a visual indicator, an abrasive, a plasticizer, a surfactant, a flame retardant agent, a biocide, a cure promoter, a tackifier, an accelerant, or combinations thereof. The one or more functional additives can include the adhesion promoter. The adhesion promoter can include a compound including a reactive silane, a reactive titanate, a reactive zirconate, or combinations thereof. The one or more functional additives can include the adhesion promoter. The one or more functional additives can include the visual indicator. The visual indicator can include a pigment, a dye, an ultraviolet indicator, or combinations thereof. The one or more functional additives can include the visual indicator. The visual indicator can absorb energy in the ultraviolet spectrum. The visual indicator can emit energy in the visible spectrum. The one or more functional additives can include the visual indicator, and the visual indicator can be a fluorescent or phosphorescent. The one or more functional additives can include the abrasive. The abrasive can include silica, alumina, silicates, talc, aluminosilicates, barium sulfate, mica, diatomite, calcium carbonate, calcium sulfate, carbon, wollastonite, or combinations thereof. The organogel composition can have a viscosity of about 0.01 to about 10 Pa·s at a shear rate of about 0.1 to about 100 sec$^{-1}$.

Examples of the disclosure can further provide a method for preparing any one or more of the organogel composition disclosed herein. The method can include contacting the one or more organic solvents, the one or more acrylates, and the one or more functional additives with one another to prepare the organogel composition. The method can also include homogenizing the organogel composition to modify a shear viscosity of the organogel composition. Homogenizing the organogel composition can include shearing, dicing, mixing, or blending the organogel composition. Homogenizing the organogel composition can include blending the organogel composition in the presence of one or more glass or ceramic particles. The method can further include separating the one or more glass or ceramic particles from the organogel composition via filtration.

Examples of the disclosure can further include a method for preparing a surface for application of a sealant. The method can include applying any one or more of the organogel composition disclosed herein to the surface. The method can also include evaporating the organic solvents from the organogel composition. The method can further include applying the sealant to the organogel composition.

The features, functions, and advantages that have been discussed can be achieved independently in various implementations or can be combined in yet other implementations further details of which can be seen with reference to the following description and drawings.

DETAILED DESCRIPTION

The following description of various aspect(s) is merely exemplary in nature and is in no way intended to limit the disclosure, its application, or uses.

As used throughout this disclosure, ranges are used as shorthand for describing each and every value that is within the range. It should be appreciated and understood that the description in a range format is merely for convenience and brevity, and should not be construed as an inflexible limitation on the scope of any examples or implementations disclosed herein. Accordingly, the disclosed range should be construed to have specifically disclosed all the possible subranges as well as individual numerical values within that range. As such, any value within the range can be selected as the terminus of the range. For example, description of a range such as from 1 to 5 should be considered to have specifically disclosed subranges such as from 1.5 to 3, from 1 to 4.5, from 2 to 5, from 3.1 to 5, etc., as well as individual numbers within that range, for example, 1, 2, 3, 3.2, 4, 5, etc. This applies regardless of the breadth of the range.

Unless otherwise specified, all percentages and amounts expressed herein and elsewhere in the specification should be understood to refer to percentages by weight. The amounts given are based on the active weight of the material.

Additionally, all numerical values are "about" or "approximately" the indicated value, and take into account experimental error and variations that would be expected by a person having ordinary skill in the art. It should be appreciated that all numerical values and ranges disclosed herein are approximate values and ranges, whether "about" is used in conjunction therewith. It should also be appreciated that the term "about," as used herein, in conjunction with a numeral refers to a value that can be ±0.01% (inclusive), ±0.1% (inclusive), ±0.5% (inclusive), ±1% (inclusive) of that numeral, ±2% (inclusive) of that numeral, ±3% (inclusive) of that numeral, ±5% (inclusive) of that numeral, ±10% (inclusive) of that numeral, or ±15% (inclusive) of that numeral. It should further be appreciated that when a numerical range is disclosed herein, any numerical value falling within the range is also specifically disclosed.

As used herein, "free" or "substantially free" of a material can refer to a composition, component, or phase where the material is present in an amount of less than 10.0 weight %, less than 5.0 weight %, less than 3.0 weight %, less than 1.0 weight %, less than 0.1 weight %, less than 0.05 weight %, less than 0.01 weight %, less than 0.005 weight %, or less than 0.0001 weight % based on a total weight of the composition, component, or phase.

All references cited herein are hereby incorporated by reference in their entireties. In the event of a conflict in a definition in the present disclosure and that of a cited reference, the present disclosure controls.

The present disclosure provides one or more organogel compositions. As used herein, the term "organogel" refers to a class of gels composed of a liquid organic phase within a three-dimensional, cross-linked network. The organogel compositions disclosed herein include one or more optional functional additives or agents capable of or configured to improve upon conventional methods of preparing a surface for treatment or application of a sealant. For example, as further described herein, the organogel compositions disclosed herein can be capable of or configured to concurrently or simultaneously clean a surface and treat the surface with an adhesion promoter, thereby effectively eliminating the step of separately cleaning the surface with an organic solvent. Accordingly, the organogel composition disclosed herein provides methods for reducing the amount of time necessary to seal a surface with a sealant, as compared to conventional methods, thereby reducing manufacturing cycle times for the product being manufactured (e.g., aircrafts), which leads to a significant cost savings. The organogel compositions disclosed herein are also capable of or configured to provide or facilitate the identification of an area or surface treated with the organogel composition (e.g., via an indicator).

Compositions disclosed herein can be or include an organogel composition including one or more organic solvents, one or more acrylates, one or more optional functional additives, or combinations thereof. The organogel composition can be capable of or configured to prepare a surface for subsequent treatment or application of a sealant (e.g., polysulfide sealant). For example, the organogel composition can be capable of or configured to clean the surface and/or prime a surface for subsequent treatment or application of a sealant. For example, the organogel composition can be capable of or configured to clean the surface and/or prime a surface for subsequent treatment or application of polymeric materials, such as a polysulfide sealant. The organogel composition can be capable of or configured to clean one or more lubricants, such as drilling lubricants, coolants, greases, waxes, or the like, or any combination thereof, from surfaces to be treated. Accordingly, the organogel compositions disclosed herein can be referred to as multifunctional organogel compositions.

The organogel composition can have a shear viscosity of from about 0.01 Pa·s to about 10 Pa·s, at a temperature of about 25° C. For example, the organogel composition can have a shear viscosity of from about 0.01 Pa·s, about 2 Pa·s, about 4 Pa·s, or about 5 Pa·s to about 6 Pa·s, about 8 Pa·s, about 9 Pa·s, or about 10 Pa·s at a temperature of about 25° C. In another example, the organogel composition can have a shear viscosity of from about 0.01 Pa·s to about 10 Pa·s, about 2 Pa·s to about 8 Pa·s, or about 4 Pa·s to about 6 Pa·s, at a temperature of about 25° C. The organogel composition can have a shear rate of about 0.1 Hz to about 100 Hz, at a temperature of about 25° C. The organogel composition can have a viscosity of about 0.01 to about 10 Pa·s at a shear rate of about 0.1 to about 100 $sec^{-1}$.

The organogel composition can have a cure time of from about 10 seconds (sec) to about 2 hours (hrs), at a temperature of about 25° C. For example, the organogel composition can have a cure time of from about 10 sec, about 60 sec, about 1 min, about 5 min, about 10 min, about 30 min, about 45 min, or about 60 min to about 65 min, about 70 min, about 90 min, about 100 min, or about 120 min, at a temperature of about 25° C. It should be appreciated that the cure time is present during fabrication or preparation of the organogel composition.

The organogel composition can exclude, be free, or substantially free of agar and/or agar gels. For example, the organogel composition can exclude, be free, or substantially free of agar as a solvent gel, such as in agar-based gels.

The one or more acrylates of the organogel composition can be capable of or configured to form a network with one another. For example, the one or more acrylates can be capable of or configured to interact (e.g., bond) with one another to form an acrylate based network, such as a cross-linked acrylate based network. In another example, the one or more acrylates can be capable of or configured to polymerize into a cross-linked network or mesh that can swell with the solvent to provide a spreadable organogel composition. The one or more acrylates can be or include one or more monomers and/or one or more oligomers. The one or more acrylates can be or include acrylate monomers having a functionality of two or greater.

Illustrative acrylates can be or include, but are not limited to, one or more acrylates, methacrylates, diacrylates, triacrylates, polyacrylates, or the like, or combinations thereof. The one or more acrylates can also be or include, but are not limited to, Tetrahydrofurfuryl Methacrylate; Isodecyl Methacrylate; 2(2-Ethoxyethoxy) Ethylacrylate; Stearyl Acrylate; Tetrahydrofuryl Acrylate; Lauryl Methacrylate; Stearyl Methacrylate; Lauryl Acrylate; 2-Phenoxyethyl Acrylate; 2-Phenoxyethyl Methacrylate; Glycidyl Methacrylate; Isodecyl Acrylate; Isobornyl Methacrylate; Isooctyl Acrylate; Tridecyl Acrylate; Tridecyl Methacrylate; Caprolactone Acrylate; Ethoxylated Nonyl Phenol Acrylate; Isobornyl Acrylate; Propoxylated Allyl Methacrylate; Methoxy Polyethylene Glycol Monomethacrylate; Polypropylene Glycol Monomethacrylate; Ethoxylated Nonyl Phenol Methacrylate; BetaCarboxyethyl Acrylate; Beta-Carboxyethyl Methacrylate; Octyl Acrylate; Decyl Acrylate; Octyl Methacrylate; Decyl Methacrylate; Ethoxylated Alkylphenol Acrylate; Ethoxylated Alkylphenol Methacrylate; Ebecryl™ 111, an Epoxy Monoacrylate commercially available from by UCB Chemicals of Brussells, Belgium; Ebecryl™ CL1039 a urethane Monoacrylate commercially available from UCB Chemicals; Hexadecyl Acrylate; Hexadecyl Methacrylate; Behenyl Acrylate; Behenyl Methacrylate; Nonyl Phenol Propoxylate Monoacrylate, Nonyl Phenol Propoxylate Monomethacrylate; Polyethylene Glycol Dimethacrylate; Polyethylene Glycol Diacrylate; Tetraethylene Glycol Diacrylate; Triethylene Glycol Diacrylate; Tripropylene Glycol Diacrylate; 1,3 Butylene Glycol Dimethacrylate; Ethoxylated Bisphenol A Dimethacrylate; Ethoxylated Bisphenol A Diacrylate; Cyclohexane Dimethanol Diacrylate; Cyclohexane Dimethanol Dimethacrylate; Polypropylene Glycol Diacrylate; Polypropylene Glycol Dimethacrylate; Polyethylene Glycol Diacrylate; Polyethylene Glycol Dimethacrylate; 1,6 Hexane Diol Diacrylate; 1,6 Hexane Diol Dimethacrylate; Propoxylated Neopentyl Glycol Diacrylate; Propoxylated Neopentyl Glycol Dimethacrylate; Ethoxylated Neopentyl Glycol Diacrylate; Ethoxylated Neopentyl Glycol Dimethacrylate; SR 9209, Alkoxylated Aliphatic Diacrylate commercially available from Sartomer of Exton, Pa.; Dipropylene Glycol Diacrylate; Dipropylene Glycol Dimethacrylate; Tripropylene Glycol Dimethacrylate; Ebecryl™ 150, a Bisphenol A derivative diacrylate commercially available from UCB Chemicals; Trimethylolpropane Trimethacrylate; Trimethylolpropane Triacrylate; Tris (2-Hydroxy Ethyl) Isocyanurate Triacrylate; Tris (2-Hydroxy Ethyl) Isocyanurate Trimethacrylate; Ethoxylated Trimethylolpropane Triacrylate; Propoxylated Trimethylolpropane Triacrylate; Ethoxylated Trimethylolpropane Trimethacrylate; Propoxylated Trimethylolpropane Trimethacrylate; Pentaerythritol Triacrylate; Pentaerythritol Trimethacrylate; Propoxylated Glyceryl Triacrylate; Propoxylated Glyceryl Trimethacrylate; Ethoxylated Glyceryl Triacrylate; Ethoxylated Glyceryl Trimethacrylate; Pentaerythritol Tetraacrylate; Di-Trimethylolpropane Tetraacrylate; Dipentaerythritol Pentaacrylate; Ethoxylated Pentaerythritol Tetraacrylate; SR 9041, a pentaacrylate Ester commercially available from Sartomer; SR 9008, an Alkoxylated Trifunctional Acrylate Ester commercially available from Sartomer; CD 9009, a trifunctional Methacrylate Ester commercially available from Sartomer; SR 9012, a trifunctional Acrylate Ester commercially available from Sartomer; CD 9050, a Monofunctional Acid Ester commercially available from Sartomer; CD 9051, a Trifunctional Acid Ester commercially available from Sartomer; SR 802, an Alkoxylated Diacrylate commercially available from Sartomer; SR 500 Trifunctional monomer commercially available from Sartomer; SR 515 Trifunctional monomer commercially available from Sartomer; SR 516 Difunctional monomer commercially available from Sartomer; SR 517 Trifunctional monomer commercially available from Sartomer; SR 518 Tetrafunctional monomer commercially available from Sartomer; SR 519 Trifunctional monomer commercially available from Sartomer; SR521 Difunctional monomer commercially available from Sartomer; SR63 3 Metallic Diacrylate commercially available from Sartomer; SR634 Metallic Dimethacrylate commercially available from Sartomer; SR 636 Metallic Diacrylate commercially available from Sartomer; SR 705 Metallic Diacrylate commercially available from Sartomer; SR 708, Metallic Dimethacrylate commercially available from Sartomer; SR 709, metallic Monomethacrylate commercially available from Sartomer; CN 934, Urethane Acrylate commercially available from Sartomer; CN 945, Trifunctional Urethane Acrylate commercially available from Sartomer; CN95 3, Urethane Acrylate commercially available from Sartomer; CN 961, Urethane Acrylate commercially available from Sartomer; CN 962, Urethane Acrylate commercially available from Sartomer; CN 963, Urethane Acrylate commercially available from Sartomer; CN 964, Urethane Acrylate commercially available from Sartomer; CN 965, Urethane Acrylate commercially available from Sartomer; CN 966, Urethane Acrylate commercially available from Sartomer; CN 980, Urethane Acrylate commercially available from Sartomer; CN 198, Urethane Acrylate commercially available from Sartomer; CN 982, Urethane Acrylate commercially available from Sartomer; CN 983, Urethane Acrylate commercially available from Sartomer; CN 984 Urethane Acrylate commercially available from Sartomer; CN 985, Urethane Acrylate commercially available from Sartomer; CN 986, Urethane Acrylate commercially available from Sartomer; CN 970, Urethane Acrylate commercially available from Sartomer; CN 971, Urethane Acrylate commercially available from Sartomer; CN 972, Urethane Acrylate commercially available from Sartomer; CN 973, Urethane Acrylate commercially available from Sartomer; CN 975, Hexafunctional Urethane Acrylate commercially available from Sartomer; CN 977, Urethane Acrylate commercially available from Sartomer; CN 978, Urethane Acrylate commercially available from Sartomer; CN 1 963, Urethane Methacrylate commercially available from Sartomer; CN 104, Epoxy Acrylate commercially available from Sartomer; CN 111, Epoxidized Soy Bean Oil Acrylate commercially available from Sartomer; CN 112, Epoxy Novolak Acrylate commercially available from Sartomer; CN 115, Modified Epoxy Acrylate commercially available from Sartomer; CN 117, Modified Epoxy Acrylate commercially available from Sartomer; CN 118, Acid modified Epoxy Acrylate commercially available from Sartomer; CN120 Epoxy Acrylate commercially available from Sartomer; CN 124, Epoxy Acrylate commercially available from Sartomer; CN 151, Epoxy Methacrylate commercially available from Sartomer; CN 130, Aliphatic Monoacrylate commercially available from Sartomer; CN 131, Aromatic Monoacrylate commercially available from Sartomer; CN 132, Aliphatic Diacrylate commercially available from Sartomer; CN 920, Polyester Acrylate commercially available from Sartomer; CN 704, Acrylated Polyester commercially available from Sartomer; CN 301, Polybutadiene Dimethacrylate commercially available from Sartomer; SB 400, 401, 402, 500, 510, 520, Aromatic Acid Methacrylate commercially available from Sartomer; Ebecryl™ 745, Acrylated Acrylic commercially available from UCB Chemicals; Ebecryl™ 754 Acrylated Acrylic commercially available from UCB Chemicals; Ebecryl™ 1701 Acrylated Acrylic commercially available from UCB Chemicals; Ebecryl™ 1710 AcrylatedAcrylic commercially available from UCB Chemicals; Ebecryl™ 1755 Acrylated Acrylic commercially available from UCB Chemicals; Ebecryl™ 230 Acrylated Urethane commercially available from UCB Chemicals; Ebecryl™ 244, Acrylated Urethane commercially available from UCB Chemicals; Ebecryl™ 264 Acrylated Urethane commercially available from UCB Chemicals; Ebecryl™ 270 Acrylated Urethane commercially available from UCB Chemicals; Ebecryl™ 284 Acrylated Urethane commercially available from UCB Chemicals; Ebecryl™ 1290 Acrylated Urethane commercially available from UCB Chemicals; Ebecryl™ 2001 Acrylated Urethane commercially available from UCB Chemicals; Ebecryl™ 4830 Acrylated Urethane commercially available from UCB Chemicals; Ebecryl™ 4833 Acrylated Urethane commercially available from UCB Chemicals; Ebecryl™ 4835 Acrylated Urethane commercially available from UCB Chemicals; Ebecryl™ 4842 Acrylated Urethane commercially available from UCB Chemicals; Ebecryl™ 4866 Acrylated Urethane commercially available from UCB Chemicals; Ebecryl™ 4883 Acrylated Urethane commercially available from UCB Chemicals; Ebecryl™ 5129 Acrylated Urethane commercially available from UCB Chemicals; Ebecryl™ 8301 Acrylated Urethane commercially available from UCB Chemicals; Ebecryl™ 8402 Acrylated Urethane commercially available from UCB Chemicals; Ebecryl™ 8800 Acrylated Urethane commercially available from UCB Chemicals; Ebecryl™ 8803 Acrylated Urethane commercially available from UCB Chemicals; Ebecryl™ 8804 Acrylated Urethane commercially available from UCB Chemicals; Ebecryl™ 8807 Acrylated Urethane commercially available from UCB Chemicals; Ebecryl™ 3604 Rubber modified Epoxy Acrylate commercially available from UCB Chemicals; Ebecryl™ 3605 Acrylated Bisphenol A Epoxy commercially available from UCB Chemicals; Ebecryl™ 3702 Fatty Acid Modified Epoxy Acrylate commercially available from UCB Chemicals; Ebecryl™ 3703 Amine Modified Bisphenol A Acrylate commercially available from UCB Chemicals; Ebecryl™ 3411 Fatty Acid Modified Epoxy Acrylate commercially available from UCB Chemicals; Ebecryl™ 3600 Amine Modified Bisphenol A Acrylate commercially available from UCB Chemicals; Ebecryl™ 168 Methacylated Acidic Monomer commercially available from UCB Chemicals; Ebecryl™ 170 Acrylated acidic monomer commercially available from UCB Chemicals; Ebecryl™ 350 Acrylated Silicone commercially available from UCB Chemicals; Ebecryl™ 1360 Silcone Hexaacrylate commercially available from UCB Chemicals; Genomer™ 4188 Urethane Acrylate commercially available from Rahn; Genomer™ 4205 Urethane Acrylate commercially available from Rahn; Genomer™ 4215 Urethane Acrylate commercially available from Rahn; Genomer™ 4246 Urethane Acrylate commercially available from Rahn; Genomer™ 4269 Urethane Acrylate commercially available from Rahn; Genomer™ 4297 Urethane Acrylate commercially available from Rahn; Genomer™ 4302 Urethane Acrylate commercially available from Rahn; Genomer™ 4312 Urethane Acrylate commercially available from Rahn; Genomer™ 4316 Urethane Acrylate commercially available from Rahn; Genomer™ 4510 Urethane Acrylate commercially available from Rahn; Genomer™ 4661 Urethane Acrylate commercially available from Rahn; Genomer™ 4205 Urethane Acrylate commercially available from Rahn; Genomer™ 5248 Urethane Acrylate commercially available from Rahn; Genomer™ 5275 Urethane Acrylate commercially available from Rahn; Genomer™ 5695 Urethane Acrylate commercially available from Rahn; Genomer™ 7154 Urethane Acrylate commercially available from Rahn; Photomer® 5018, polyester acrylate commercially available from Photomer Energy Curing Chemicals; Photomer® 5018, polyester acrylate commercially available from Photomer Energy Curing Chemicals; RCC™ 13-429, polyester acrylate commercially available from Photomer Energy Curing Chemicals; RCC™ 13-430, polyester acrylate commercially available from Photomer Energy Curing Chemicals; RCC™ 13-432, polyester acrylate commercially available from Photomer Energy Curing Chemicals; RCC™ 13-433, polyester acrylate commercially available from Photomer Energy Curing Chemicals; Photomer® 6008, Urethane Acrylate commercially available from Photomer Energy Curing Chemicals; Photomer® 6010, Urethane Acrylate commercially available from Photomer Energy Curing Chemicals; Photomer® 6022, Urethane Acrylate commercially available from Photomer Energy Curing Chemicals; Photomer® 6184, Urethane Acrylate commercially available from Photomer Energy Curing Chemicals; Photomer® 6210, Urethane Acrylate commercially available from Photomer Energy Curing Chemicals; Photomer® 6217, Urethane Acrylate commercially available from Photomer Energy Curing Chemicals; Photomer® 6788-20R, Urethane Acrylate commercially available from Photomer Energy Curing Chemicals; Photomer® 6893, Urethane Acrylate commercially available from Photomer Energy Curing Chemicals; RCC™ 12-891, Urethane Acrylate commercially available from Photomer Energy Curing Chemicals; RCC™ 12-892, Urethane Acrylate commercially available from Photomer Energy Curing Chemicals; RCC™ 13-363, Urethane Acrylate commercially available from Photomer Energy Curing Chemicals; Photomer® 6173, Aromatic Acrylate commercially available from Photomer Energy Curing Chemicals; RCC™ 13-424, Polyester Acrylate commercially available from Photomer Energy Curing Chemicals. In an exemplary implementation, the one or more acrylates include polybutadiene dimethacrylate, pentaerythritol tetraacrylate, or the like, or combinations thereof.

The amount of the one or more acrylates present in the organogel composition can vary widely. The amount of the one or more acrylates present can be at least partially determined by a target or desired viscosity of the organogel composition. The amount of the one or more acrylates present in the organogel composition can be from about 1 weight % to about 25 weight %, based on a total weight of the organogel composition. For example, the amount of the one or more acrylates present in the organogel composition can be from about 1 weight %, about 5 weight %, or about 10 weight % to about 15 weight %, about 20 weight %, or about 25 weight %, based on a total weight of the organogel composition. In another example, the amount of the one or more acrylates present in the organogel composition can be from about 1 weight % to about 25 weight %, about 5 weight % to about 20 weight %, or about 10 weight % to about 15 weight %.

The one or more organic solvents of the organogel composition can be capable of or configured to disperse, solubilize, solvate, or otherwise dissolve one or more substances or components of the organogel composition. The one or more organic solvents can also be capable of or configured to disperse, solubilize, solvate, or otherwise dissolve one or more substances, such as greases, oils, or debris, on surfaces contacted with the organogel composition. For example, the one or more organic solvents of the organogel composition can be capable of or configured to dissolve the one or more acrylates, the one or more adhesion promoters, the one or more optional functional additives, or combinations thereof. The one or more organic solvent can also be capable of or configured to prepare a surface for subsequent treatment or application of a sealant. For example, the one or more organic solvents can be capable of or configured to at least partially provide a cleaning treatment of a surface that is to be treated with a sealant, such as a polysulfide sealant. It should be appreciated that any organic solvent capable of or configured to dissolve one or more components of the organogel composition and/or prepare the surface for subsequent treatment or application of a sealant can be utilized.

The one or more organic solvents can be or include, but are not limited to, aliphatic hydrocarbons, aromatic compounds, such as aromatic hydrocarbons, halogenated hydrocarbons, nitrated hydrocarbons, ketones, amines, esters, alcohols, aldehydes, ethers, or the like, or combinations thereof.

Illustrative aliphatic hydrocarbon that can be utilized as the one or more organic solvents can be or include, but are not limited to, n-pentane, n-hexane, n-octane, n-nonane, n-decane, or homologues thereof, 2,2,4-trimethyl pentane, or the like, or any combination thereof.

Illustrative aromatic compounds that can be utilized as the one or more organic solvents can be or include, but are not limited to, cyclohexane, benzene, toluene, ethylebenzene, xylene, tetralin, hexafluoro xylene, or the like, or any combination thereof.

Illustrative halogenated hydrocarbons that can be utilized as the one or more organic solvents can be or include, but are not limited to, chloroform, methylene chloride, trichloro ethylene, or the like, or combinations thereof.

Illustrative ketone organic solvents can be or include, but are not limited to, acetone, methyl ethyl ketone (MEK), diethyl ketone, methyl propyl ketone (MPK), dipropyl ketone, methyl isobutyl ketone (MIBK), cyclopentanone, cyclohexanone, methyl amyl ketone, n-methyl -2-pyrrolidone, diisobutyl ketone, acetophenone, or the like, or combinations thereof.

Illustrative esters that can be utilized as the one or more organic solvents can be or include, but are not limited to, methyl acetate, ethyl acetate, isopropyl acetate, n-butyl acetate, cellosolve acetate, or the like, or combinations thereof.

Illustrative alcohols that can be utilized as the one or more organic solvents can be or include, but are not limited to, methanol, ethanol, n-propanol, i-propanol, n-butanol, i-butanol, s-butanol, n-amyl alcohol, i-amyl alcohol, cyclohexanol, n-octanol, ethanediol, diethylene glycol, 1,2-propanediol, or the like, or combinations thereof.

Illustrative aldehydes that can be utilized as the one or more organic solvents can be or include, but are not limited to, furfuraldehyde, or the like.

Illustrative ethers that can be utilized as the one or more organic solvents can be or include, but are not limited to, diethyl ether, diisopropyl ether, dibutyl ether, methyl tert butyl ether, 1,4-dioxane, tetrahydrofuran, oligomers of perfluoropolyethers, such as the GALDEN® line, which is commercially available from Solvay of Houston, Tex., or the like, or combinations thereof.

The amount of the one or more organic solvents present in the organogel composition can vary widely. The amount of the one or more organic solvents present can be at least partially determined by a target or desired viscosity of the organogel composition. The amount of the one or more organic solvents present in the organogel composition can be from about 75 weight % to about 99.5 weight %, based on a total weight of the organogel composition. For example, the amount of the one or more organic solvents present in the organogel composition can be from about 75 weight %, about 80 weight %, about 85 weight % or about 90 weight % to about 95 weight %, about 98 weight %, about 99 weight %, or about 99.5 weight %, based on a total weight of the organogel composition. In another example, the amount of the one or more organic solvents present in the organogel composition may be from about 75 weight % to about 99.5 weight %, about 80 weight % to about 99 weight %, about 85 weight % to about 95 weight %, or about 85 weight % to about 90 weight %, based on a total weight of the organogel composition.

The organogel composition can include one or more optional functional additives capable of or configured to provide additional functional properties to the organogel composition. The one or more optional functional additives can be or include, but are not limited to, one or more adhesion promoters, one or more indicators (e.g., visual indicators), one or more abrasives, one or more plasticizers, one or more surfactants, one or more flame retardant agents, one or more biocides, one or more tackifiers capable of or configured to modify tack of the organogel composition, one or more cure promoters, one or more accelerants, or the like, or any combination thereof. Examples of optional functional additives referred to herein are discussed further in turn below. The optional functional additives may be combined with the organogel composition to add one or more functionalities alone or in combination with other additives for further functionalities.

The one or more adhesion promoters of the organogel composition can be capable of or configured to facilitate adhesion of a sealant applied to a surface after treatment with the organogel composition. For example, the adhesion promoter can be capable of or configured to promote compatibility and/or adhesion between two different sealant layers.

The one or more adhesion promoters can be or include, but are not limited to, one or more compounds including at least one reactive silane, reactive titanate, reactive zirconate, or the like, or any combination thereof. As further described herein, the one or more adhesion promoters can also be or include, but are not limited to one or more sealants.

Illustrative silane adhesion promoters can include, but are not limited to, bis(trimethoxysilylethyl)benzene, bis(triethoxysilylethyl)benzene, 3-Acryloxypropyltrimethoxysilane, 3-Methacryloxypropyltrimethoxysilane, aminopropyltrimethoxysilane, vinyl trimethoxysilane, allyl trimethoxysilane, 3-Mercaptopropyltrimethoxysilane, or combinations thereof.

The titanate adhesion promoters can, but is not required to, include at least one UV curable functional group, such as an acrylate functional group. The UV curable functional group allows the titanate adhesion promoter to cure or facilitate curing via exposure to UV. The titanate adhesion promoter can include an ethylenically unsaturated titanate containing compound, a neoalkoxy titanate containing compound, or combinations thereof. Illustrative titanate adhesion promoters can include, but are not limited to, tetra (2, 2 diallyoxymethyl)butyl, di(ditridecyl)phosphito titanate, commercially available as KR 55, from Kenrich Petrochemcials, Inc. (hereinafter "Kenrich") of Bayonne, N.J.; neopentyl(diallyl)oxy, trineodecanonyl titanatem, commercially available as LICA 01 from Kenrich; neopentyl(diallyl)oxy, tri(dodecyl)benzene-sulfony titanate, commercially available as LICA 09 from Kenrich; neopentyl(diallyl)oxy, tri (dioctyl)phosphato titanate, commercially available as LICA 12 from Kenrich; neopentyl(dially)oxy, tri(dioctyl) pyro-phosphato titanate, commercially available as LICA38 from Kenrich; neopentyl(diallyl)oxy, tri(N-ethylenediamino)ethyl titanate, commercially available as LICA 44 from Kenrich; neopentyl(diallyl)oxy, tri(m-amino)phenyl titanate, commercially available as LICA 97 from Kenrich; neopentyl(diallyl)oxy, trihydroxy caproyl titanate, commercially available as LICA 99 from Kenrich; or the like, or combinations thereof.

The zirconate adhesion promoter can, but is not required to, include at least one UV curable functional group, such as a methylacrulate or an acrylate functional group. The zirconate adhesion promoters can include an ethylenically unsaturated zirconium containing compound, a neoalkoxy zirconate containing compound, or combinations thereof. Illustrative zirconate adhesion promoters can be or include, but are not limited to, tetra (2,2 diallyloxymnethyl)butyl, di(ditridecyl)phosphito zirconate, commercially available as KZ 55 from Kenrich; neopentyl(diallyl)oxy, trineodecanoyl zirconate, commercially available as NZ 01 from Kenrich; neopentyl(diallyl)oxy, tri(dodecyl)benzene-sulfony zirconate, commercially available as NZ 09 from Kenrich; neopentyl(diallyl)oxy, tri(dioctyl)phosphato zirconate, commercially available as NZ 12 from Kenrich; neopentyl(diallyl) oxy, tri(dioctyl)pyro-phosphato zirconate, commercially available as NZ 38 from Kenrich; neopentyl(diallyl)oxy, tri(N-ethylenediamino)ethyl zirconate, commercially available as NZ 44 from Kenrich; neopentyl(diallyl)oxy, tri(m-amino)phenyl zirconate, commercially available as NZ 97 from Kenrich; neopentyl(diallyl)oxy, trimethacryl zirconate, commercially available as NZ 33 from Kenrich; neopentyl (diallyl)oxy, triacryl zirconate, commercially available as NZ 39 from Kenrich; dineopentyl(diallyl)oxy, diparamino benzoyl zirconate, commercially available as NZ 37 from Kenrich; dineopentyl(aiallyl)oxy, di(3-mercapto) propionic zirconate, commercially available as NZ 66A from Kenrich; or combinations thereof.

As discussed above, the one or more adhesion promoters can also be or include, but are not limited to, one or more sealants, such as sealants conventionally used to clean any surfaces, such as a surface of a fillet seal or a fuel tank, or the like. As used herein, the term or expression "sealant" can refer to compositions that can have the ability to resist atmospheric conditions such as moisture and temperature and at least partially block transmission of materials such as water, fuel, and other liquids and gases. It should be appreciated that sealants can have adhesive properties. It should further be appreciated that the sealants can be generally identified by "Class," as determined by their viscosity. The one or more adhesion promoters of the organogel composition can be or include, but are not limited to, Class A sealants, Class B sealants, Class C sealants, or any combination thereof. Class A sealants can generally have a viscosity of from about 100 poise to about 400 poise, and can generally be suitable for application by brushing, injecting, or spraying. Class A sealants can have an application time of about 0.5 hours to about 2 hours. Class B sealants can generally have a viscosity of from about 6000 to about 18000 poise, and can generally be suitable for application by extrusion gun or spatula. Class B sealants can have an application time of about 0.5 hours to about 2 hours. Class C sealants can generally have a viscosity between that of a Class A sealant and a Class B sealant. For example, Class C sealants can generally have a viscosity of from about 1000 to about 4000 poise, and can generally be suitable for faying surface or shim sealing, brush coating, or wet installation. Class C sealants can have an application time of about 2 hours to about 96 hours. Viscosity of the Class A, Class B, and Class C sealants can be measured by a cone and plate rheometer (ASTM D4287) or Brookfield viscometer (ASTM D2196). In an exemplary implementation, the one or more adhesion promoters includes a Class A sealant.

Illustrative sealant adhesion promoters can be or include, but are not limited to, one or more silanes, one or more titanates, one or more zirconates, or the like, or combinations thereof.

The one or more adhesion promoters can be present in an amount of from about 0.01 weight % to about 10 weight %, based on a total weight of the organogel composition. For example, the one or more adhesion promoters can be present in an amount of from about 0.01 weight %, about 0.5 weight %, about 1 weight %, about 1.5 weight %, about 2 weight %, or about 2.5 weight % to about 2.75 weight %, about 3 weight %, about 3.5 weight %, about 4 weight %, about 4.5 weight %, or about 10.0 weight %, based on a total weight of the organogel composition. In another example, the one or more adhesion promoters can be present in an amount of from about 0.01 weight % to about 10.0 weight %, about 1 weight % to about 8.0 weight %, about 2.0 weight % to about 6.0 weight %, or about 5 weight %, based on a total weight of the organogel composition.

The one or more indicators or visual indicators can be capable of or configured to facilitate, promote, or provide identification of an area or surface treated with the organogel composition. For example, the visual indicators can be capable of or configured to allow a user to identify what surfaces or areas have been treated by the organogel composition in varying environments (e.g., low light, confined space, etc.). The one or more indicators can be or include, but are not limited to, one or more dyes, pigments, ultraviolet (UV) indicators, or the like, or combinations thereof. The one or more indicators can be visible in the visible spectrum (wavelength of 380 nm to 700 nm), the UV spectrum (wavelength of 10 nm to 380 nm), or combinations thereof. The one or more indicators can absorb in the UV spectrum and emit in the visible spectrum. Said in another way, the visual indicator can absorb energy in the ultraviolet spectrum, and the visual indicator can emit energy in the visible spectrum. The one or more indicators can include one or more fluorescent compounds, phosphorescent compounds, or combinations thereof.

Illustrative indicators can be or include, but are not limited to, a proprietary blend of Chromate(2-), [4-[(5-chloro-2-hydroxy-3-nitrophenyl)azo]-2,4-dihydro-5-methyl-2-phenyl-3H-pyrazol-3-onato(2-)][3-[[1-(3-chlorophenyl)-4,5-dihydro-3-methyl-5-oxo-1H-pyrazol-4-yl]azo]-4-hydroxy-5-nitrobenzenesulfonato(3-)]-, di sodium, 1-methoxy-2-propanol, 1,2-propanediol, and 2-methoxypropanol, a crimson red solvent based red liquid dye commercially available from KEDA™ Dye of Manitowoc, Wis., Triple Glow Powder commercially available from GLONATION of Falmouth, Ky., or the like, or combinations thereof.

The one or more indicators can be present in an amount of from about 0.01 weight % to about 5 weight %, based on a total weight of the organogel composition. For example, the one or more indicators can be present in an amount of from about 0.01 weight %, about 0.05 weight %, about 0.1 weight %, about 0.5 weight %, about 1 weight %, about 2 weight %, or about 2.5 weight % to about 3 weight %, about 3.5 weight %, about 4 weight %, about 4.5 weight %, or about 5 weight %, based on a total weight of the organogel composition. In another example, the one or more indicators can be present in an amount of from about 0.01 weight % to about 5 weight %, about 2 weight % to about 4 weight %, or about 3 weight % to about 3.5 weight %, based on a total weight of the organogel composition.

The organogel composition can include one or more abrasives. As used herein, the term "abrasive" can also refer to materials commonly referred to as "polishing agents." The one or more abrasives can be capable of or configured to roughen the surface to facilitate, improve, or otherwise aid adhesion. The one or more abrasives can also be capable of or configured to roughen the surface to facilitate, improve, or otherwise aid adhesion through adhesion promoter chemistry. The one or more abrasives can also be capable of or configured to facilitate, improve, or otherwise aid in the removal of debris and/or residue from the surface.

Illustrative abrasives of the organogel composition can be or include, but are not limited to, silica, alumina, hydrated alumina, silicates (e.g., zirconium silicate, aluminum silicate including calcined aluminum silicate), talc, aluminosilicates, barium sulfate, mica, diatomites, calcium carbonate, calcium sulfate, carbon, wollastonite, metaphosphate compounds, phosphate salts (e.g., insoluble phosphate salts), such as sodium metaphosphate, potassium metaphosphate, calcium pyrophosphate, magnesium orthophosphate, trimagnesium orthophosphate, tricalcium phosphate, dicalcium phosphate dihydrate, anhydrous dicalcium phosphate, calcium carbonate, magnesium carbonate, or the like, or combinations thereof.

The one or more abrasives can be present in an amount of from about 0.1 weight % to about 10 weight %, based on a total weight of the organogel composition. For example, the one or more abrasives can be present in an amount of from about 0.1 weight %, about 0.5 weight %, about 1 weight %, about 1.5 weight %, about 2 weight %, about 3 weight %, about 4 weight %, or about 5 weight % to about 6 weight %, about 6.5 weight %, about 7 weight %, about 8 weight %, about 9 weight %, or about 10 weight %, based on a total weight of the organogel composition. In another example, the one or more abrasives can be present in an amount of from about 0.1 weight % to about 10 weight %, about 2 weight % to about 8 weight %, or about 4 weight % to about 6 weight %.

The organogel composition can include one or more plasticizers. As used herein, the term "plasticizer" can refer to any component, compound, or substance that can facilitate, produce, or promote plasticity and flexibility and/or reduce brittleness. As such, one or more plasticizers can be incorporated to modify (e.g., increase or decrease) plasticity, flexibility, and/or brittleness of the organogel composition.

The one or more plasticizers can be present in an amount of from about 0.1 weight % to about 10 weight %, based on a total weight of the organogel composition. For example, the one or more plasticizers can be present in an amount of from about 0.1 weight %, about 0.5 weight %, about 1 weight %, about 1.5 weight %, about 2 weight %, about 3 weight %, about 4 weight %, or about 5 weight % to about 6 weight %, about 6.5 weight %, about 7 weight %, about 8 weight %, about 9 weight %, or about 10 weight %, based on a total weight of the organogel composition. In another example, the one or more plasticizers can be present in an amount of from about 0.1 weight % to about 10 weight %, about 2 weight % to about 8 weight %, or about 4 weight % to about 6 weight %.

The organogel composition can include one or more surfactants. As used herein, the term "surfactant" can refer to any component, compound, or substance that reduces surface tension in a solution or reduces interfacial tension between two liquids, or between a liquid and a solid. The one or more surfactants can be capable of or configured to facilitate or aid in the cleaning the surface of oil and/or debris. The one or more surfactants can be capable of or configured to better disperse any one or more components, particulates, or elements of the organogel composition with another one or more components, particulates, or elements of the organogel composition. In an exemplary implementation, the organogel composition includes at least one nonionic surfactant.

The one or more surfactants can be or include one or more anionic surfactants, one or more amphoteric surfactants, one or more cationic surfactants, one or more zwitterionic surfactants, one or more nonionic surfactants, or mixtures thereof. Illustrative surfactants of the organogel composition can be or include, but are not limited to, ionic surfactants and/or nonionic surfactants including octylphenoxy polyethoxy ethanols, such as TRITON™ X-100, X-114, and X-405, commercially available from Union Carbide Co. of Danbury, Conn.

The one or more surfactants can be present in an amount of from about 0.1 weight % to about 10 weight %, based on a total weight of the organogel composition. For example, the one or more surfactants can be present in an amount of from about 0.1 weight %, about 0.5 weight %, about 1 weight %, about 1.5 weight %, about 2 weight %, about 3 weight %, about 4 weight %, or about 5 weight % to about 6 weight %, about 6.5 weight %, about 7 weight %, about 8 weight %, about 9 weight %, or about 10 weight %, based on a total weight of the organogel composition. In another example, the one or more surfactants can be present in an amount of from about 0.1 weight % to about 10 weight %, about 2 weight % to about 8 weight %, or about 4 weight % to about 6 weight %.

The organogel composition can include one or more flame retardant agents. As used herein, the term "flame retardant agents" can refer to any component, compound, or substance that reduces, slows, or otherwise stops the spread and/or intensity of a fire. The one or more flame retardant agents can be capable of or configured to provide flame retardant properties to the organogel composition.

Illustrative flame retardant agents of the organogel composition can be or include, but are not limited to, halogenated species or phosphorous containing species, or the like, or combinations thereof.

The one or more flame retardant agents can be present in an amount of from about 0.1 weight % to about 10 weight %, based on a total weight of the organogel composition. For example, the one or more flame retardant agents can be present in an amount of from about 0.1 weight %, about 0.5 weight %, about 1 weight %, about 1.5 weight %, about 2 weight %, about 3 weight %, about 4 weight %, or about 5 weight % to about 6 weight %, about 6.5 weight %, about 7 weight %, about 8 weight %, about 9 weight %, or about 10 weight %, based on a total weight of the organogel composition. In another example, the one or more flame retardant agents can be present in an amount of from about 0.1 weight % to about 10 weight %, about 2 weight % to about 8 weight %, or about 4 weight % to about 6 weight %.

The organogel composition can include one or more biocides. As used herein, the term "biocides" can refer to any component, compound, or substance that kills or inhibits the growth of microorganisms such as bacteria, molds, slimes, fungi, or the like, or any combination thereof.

Illustrative biocides of the organogel composition can be or include, but are not limited to, chlorinated hydrocarbons, organometallics, halogen-releasing compounds, metallic salts, organic sulfur compounds, quaternary ammonium compounds, phenolics, or the like, or combinations thereof.

The one or more biocides can be present in an amount of from about 0.1 weight % to about 10 weight %, based on a total weight of the organogel composition. For example, the one or more biocides can be present in an amount of from about 0.1 weight %, about 0.5 weight %, about 1 weight %, about 1.5 weight %, about 2 weight %, about 3 weight %, about 4 weight %, or about 5 weight % to about 6 weight %, about 6.5 weight %, about 7 weight %, about 8 weight %, about 9 weight %, or about 10 weight %, based on a total weight of the organogel composition. In another example, the one or more biocides can be present in an amount of from about 0.1 weight % to about 10 weight %, about 2 weight % to about 8 weight %, or about 4 weight % to about 6 weight %.

The organogel composition can include one or more cure promoters. As used herein, the term "cure promoter" can refer to any component, compound, or substance that facilitates or promotes the curing of the polymeric material, such as polysulfide sealants.

Illustrative cure promoters of the organogel composition can be or include, but are not limited to, N, N-dimethyl-para-toluidine (DMPT), N-(2-hydroxyethyl)-N-methyl-para-toluidine (MHPT), or combinations thereof. Illustrative cure promoters of the organogel composition can also include, but are not limited to those cure promoters capable of promoting the cure of sealant material and form the organogel during an initial synthesis, such as prior to packaging in a container. For example, the cure promoters can include thiuram, thiuram disulfide, tetrabenzylthiuram disulfide such as WESTCO™ TBzTD, tetramethyl thiuram disulfide, tetraethyl thiuram disulfide, tetramethylthiuram monosulfide, dipentamethylene thiuram tetrasulfate, dipentaethylene thiuramelemental sulfur, or the like, or combinations thereof.

The one or more cure promoters can be present in an amount of from about 0.01 weight % to about 10 weight %, based on a total weight of the organogel composition. For example, the one or more cure promoters can be present in an amount of from about 0.1 weight %, about 0.5 weight %, about 1 weight %, about 1.5 weight %, about 2 weight %, about 3 weight %, about 4 weight %, or about 5 weight % to about 6 weight %, about 6.5 weight %, about 7 weight %, about 8 weight %, about 9 weight %, or about 10 weight %, based on a total weight of the organogel composition. In another example, the one or more cure promoters can be present in an amount of from about 0.1 weight % to about 10 weight %, about 2 weight % to about 8 weight %, or about 4 weight % to about 6 weight %.

The organogel composition can include one or more accelerants, initiators, and/or coinitiators. As used herein, the term or expression "accelerants," "initiator," or "coinitiator" can refer to any component, compound, or substance that facilitates or promotes the polymerization and/or cross-linking between the one or more acrylates of the organogel composition.

The initiators and/or coinitiators can be or include, but are not limited to, one or more radical initiators, one or more photoinitiators, or the like, or any combination thereof. Illustrative initiators and/or coinitiators can be or include, but are not limited to, one or more azo compounds, such as 4,4'-azobis(4-cyanovaleric acid), 1,1'-azobis(cyclohexanecarbonitrile), azobisisobutyronitrile, 2,2'-azobis(2-methylpropionitrile), or 2,2'-Azobis(2-methylpropionitrile), one or more inorganic peroxides, such as ammonium persulfate, hydroxymethanesulfinic acid monosodium salt dihydrate, potassium persulfate, or sodium persulfate, one or more organic peroxides, such as benzoyl peroxide, t-butyl hydroperoxide, cumene hydroperoxide, dicumyl peroxide, t-butyl peroxide, or the like, or any combination thereof. The illustrative initiators and/or coinitiators can also be or include, but are not limited to, one or more organic photoinitiators, such as one or more acetophenone, one or more benzyl and benozoin compounds, one or more benzophenones, one or more cationic photoinitiators, one or more thioxanthones, camphorquinone, 2-(dimethylamino)ethyl methacrylate, or the like, or any combination thereof.

The one or more initiators and/or coinitiators can be present in an amount of from about 0.1 weight % to about 10 weight %, based on a total weight of the organogel composition. For example, the one or more initiators and/or coinitiators can be present in an amount of from about 0.1 weight %, about 0.5 weight %, about 1 weight %, about 1.5 weight %, about 2 weight %, about 3 weight %, about 4 weight %, or about 5 weight % to about 6 weight %, about 6.5 weight %, about 7 weight %, about 8 weight %, about 9 weight %, or about 10 weight %, based on a total weight of the organogel composition. In another example, the one or more initiators and/or coinitiators can be present in an amount of from about 0.1 weight % to about 10 weight %, about 2 weight % to about 8 weight %, or about 4 weight % to about 6 weight %.

Methods

Methods for preparing any one or more of the organogel compositions disclosed herein are provided. The method can include combining, mixing, blending, or otherwise contacting the one or more organic solvents, the one or more acrylates, and/or the one or more optional functional additives (e.g., adhesion promoters, indicators, abrasives, plasticizers, surfactants, flame retardant agents, and/or biocides) with one another to prepare a mixture. It should be appreciated that the order of mixing or contacting each of the components of the organogel composition can be at least partially determined by the specific components selected. The method can also include purging the mixture with nitrogen to remove dissolved oxygen. The method can further include combining, mixing, blending, or otherwise contacting the mixture with one or more initiators and/or coinitiators. The method can also include forming a network between the one or more acrylates. For example, the method can also include polymerizing and/or cross-linking the one or more acrylates of the mixture to prepare the organogel composition. It should be appreciated that the one or more optional functional additives can be added before and/or after polymerizing and/or cross-linking the one or more acrylates of the mixture. The polymerization and/or cross-linking of the one or more acrylates can be performed at room temperature and/or with added heat. The method can also include exposing the mixture, including a photoinitiator, to predetermined wavelengths of light to promote polymerization and/or cross-linking.

The method can also include subjecting the organogel composition to viscosity modification. For example, the method can include homogenizing the organogel composition via shearing and/or dicing in an industrial blender, immersion blender, centrifugal mixer, or the like, or any combination thereof. The organogel composition can be subjected to viscosity modification for a period of from about 5 seconds (sec), about 10 sec, about 30 sec, or about 1 min to about 2 min, about 3 min, about 5 min, about 10 min, about 30 min, or greater. The method can include adding additional organic solvents to the organogel prior to homogenizing the organogel composition. The organogel composition can be homogenized, for example, in a centrifugal mixer, in the presence of one or more particles. Illustrative particles can be or include, but are not limited to, one or more glass particles, ceramic particles, or the like, or any combination thereof.

The method can further include separating the one or more particles and/or relatively larger organogel agglomerations from the organogel composition after homogenization. For example, the method can include separating the particles and/or relatively larger organogel agglomerations from the organogel composition via filtration. Filtration can include passing the organogel composition including the one or more particles (e.g., glass particles) and/or the relatively larger organogel agglomerations through a filter having a pore size less than about 1 mm, less than about 0.5 mm, less than about 0.25 mm, or less than about 0.1 mm.

Methods for utilizing any one or more of the organogel compositions disclosed herein to treat a surface prior to application of a sealant are provided. The surface can be any surface or substrate to be treated with a sealant. For example, the surface can be a surface of a bridge truss, support column, construction object, building, vehicle, such as an atmospheric vehicle, an aerospace vehicle, an unmanned vehicle, an aircraft, a spacecraft, a satellite, a rocket, a missile, or the like, or any components thereof.

The method for utilizing the organogel composition to treat the surface can include applying or contacting the organogel composition with the surface. The organogel composition can be contacted with the surface via a brush, a roller, an extrusion gun, a spray gun, or the like, or any combination thereof. The organogel composition can be capable of or configured to eliminate one or more steps in the conventional process or method of preparing a surface for the application of a sealant. For example, in a conventional process of preparing a surface for the application of a sealant, the surface is first treated with a solvent, and subsequently treated with an adhesion promoter. The organogel composition disclosed herein is capable of or configured to concurrently or simultaneously clean the surface and treat the surface with the adhesion promoter, thereby effectively eliminating at least one step in the conventional methods of preparing the surface for the application of a sealant.

The method for utilizing the organogel composition to treat the surface can include evaporating the one or more organic solvents of the organogel composition. The method can further include activating the one or more adhesion promoters of the organogel composition. The method can also include filling a seal cap with a Class B sealant and disposing the seal cap adjacent the organogel composition on the surface. The method can further include curing the Class B sealant. The method can also include filling a seal cap with a thixotropic sealant and disposing the seal cap after the application of the organogel composition on the surface. Similarly, the method can also include extruding the thixotropic sealant on the aircraft structure after application of the organogel composition on the surface.

EXAMPLES

The examples and other implementations described herein are exemplary and not intended to be limiting in describing the full scope of compositions and methods of this disclosure. Equivalent changes, modifications and variations of specific implementations, materials, compositions and methods can be made within the scope of the present disclosure, with substantially similar results.

Example 1

An exemplary organogel composition (1) including a dye indicator was prepared. To prepare the organogel composition (1), 1 mL of a dye, namely, a crimson red solvent based red liquid dye commercially available from KEDA™ Dye of Manitowoc, Wis., and 300 g of an organic solvent, namely, methyl propyl ketone (MPK), commercially available from SIGMA-ALDRICH® of St. Louis, Mo., was combined with one another to prepare a first mixture. 1.5 g of pentaerythritol tetraacrylate, 3 g of polybutadiene dimethyacrylate, and 25.5 g of the first mixture were mixed with one another at about 2300 RPM for about 2 minutes to prepare a second mixture. The second mixture of the acrylates, the MPK, and the dye was then purged or bubbled with nitrogen ($N_2$) to remove dissolved oxygen, which can act as a radial inhibitor. About 1 parts per hundred rubber (PHR) of an initiator, namely, benzoyl peroxide Luperox® A98, which is commercially available from SIGMA-ALDRICH® was added to the second mixture and subsequently mixed to ensure that the initiator was fully dissolved. 300 μL of a cure promoter, namely, FIRSTCURE® DMPT or N,N-dimethylpara-toluidine, which is commercially available from ALBEMARLE® Corp. of Charlotte, N.C., was combined with the second mixture and mixed for about 30 seconds. The second mixture was then kept in a sealed container and maintained at a temperature of about 60° C. to accelerate polymerization and prepare the organogel composition (1). It should be appreciated that at about 60° C., polymerization occurs between about 5 min and about 45 min, and at about 90° C. polymerization occurs within about 5 min. After polymerization, the organogel composition (1) was stored or maintained in the sealed container.

Example 2

An exemplary organogel composition (2) including a photoinitiator was prepared. To prepare the organogel (2), 0.5 g of pentaerythritol tetraacrylate, 1 g of polybutadiene dimethyacrylate, and 8.5 g of MPK were mixed with one another at about 2300 RPM for about 2 min to homogenize the mixture. The homogenized mixture was then purged with nitrogen ($N_2$) to remove dissolved oxygen, which can act as a radial inhibitor. 0.5 PHR of a photoinitiator and 55 μL of a coinitiator, namely, camphorquinone and 2-(dimethylamino)ethyl methacrylate (DMAEMA), respectively, were combined with the homogenized mixture and mixed until fully dissolved. It should be appreciated that the addition of the coinitiator increases the photoinitiating efficiency of the system. The mixture was then maintained in a sealed container and exposed to an LED blue light lamp (wavelength of about 400 to 405 nm) for about 10 minutes to polymerize or cure the mixture and prepare the organogel composition (2). The cured organogel composition (2) was then stored in the sealed container.

Example 3

An exemplary organogel composition (3) including a fluorescent indicator and a photoinitiator was prepared. To prepare the organogel composition (3) 0.2 PHR of a fluorescent powder indicator, namely, Triple Glow Powder, commercially available from GLONATION of Falmouth, Ky., was combined with 350 g of MPK to prepare a first mixture. 2 g of pentaerythritol tetraacrylate, 4 g of polybutadiene dimethyacrylate, and 34 g of the first mixture were mixed with one another at about 2300 RPM for about 2 minutes to prepare a second mixture. The second mixture of the acrylates, the MPK, and the fluorescent indicator was then purged with nitrogen ($N_2$) to remove dissolved oxygen, which can act as a radial inhibitor. 0.5 PHR of a photoinitiator and 55 µL of a coinitiator, namely, camphorquinone and 2-(dimethylamino)ethyl methacrylate (DMAEMA), respectively, were combined with the homogenized mixture and mixed until fully dissolved. It should be appreciated that the addition of the coinitiator increases the photoinitiating efficiency of the system. The mixture was then maintained in a sealed container and exposed to an LED blue light lamp (wavelength of about 400 to 405 nm) for about 10 minutes to polymerize or cure the mixture and prepare the organogel composition (2). The cured organogel composition (2) was then stored in the sealed container.

Example 4

The exemplary organogel composition (1) prepared in Example 1 was subjected to a viscosity modification process. Particularly, about 2.5 g of MPK and about 10 g of the organogel composition (1) (weight ratio of about 1:4) were mixed in a centrifugal mixer containing glass beads at about 2300 RPM for about 5 min. The resulting mixture was filtered to remove all the glass beads. The solid content of the organogel composition (1) was measured before and after viscosity modification. The solid content of the organogel composition (1) dropped from about 15 weight % to about 12 weight % after viscosity modification. It was observed that the organogel composition (1) did not flow under its own weight after viscosity modification.

The exemplary organogel composition (1) prepared in Example 1 was also subjected to another viscosity modification process. Particularly, about 10 g of MPK and about 20 g of the organogel composition (1) (weight ratio of about 1:2) were mixed in a centrifugal mixer containing glass beads at about 2300 RPM for about 5 min. The resulting mixture was filtered to remove all the glass beads. After filtration, the resulting mixture was transferred to an industrial blender for further homogenization. The solid content of the organogel composition (1) was measured before and after viscosity modification. The solid content of the organogel composition (1) dropped from about 15 weight % to about 10 weight % after viscosity modification. It should be appreciated, however, that the solids content of the organogel composition (1) can be reduced to below 10 weight % by further viscosity modification and/or modification of the weight ratio of the solvent to the organogel composition.

The shear rate and viscosity of the resulting organogel composition (1) after viscosity modification was measured using a Kinexsus Rheometer with a 1 inch plate diameter and a 1 mm gap distance (ASTM D4287). The results of the shear rate and viscosity are summarized in Table 1 below.

TABLE 1

Shear Viscosity of Organogel Composition (1) After Viscosity Modification

| Treatment | Weight % of Organogel Composition (1) | Shear Rate (Hz) | Shear Viscosity (Pa · s) |
|---|---|---|---|
| Centrifugal Mixing w/Glass Beads | 12 | 1.08 | 223.5 |
| Centrifugal Mixing w/Glass Beads + Industrial Blender | 10 | 1.059 | 29.67 |

The present disclosure has been described with reference to exemplary implementations. Although a limited number of implementations have been shown and described, it will be appreciated by those skilled in the art that changes can be made in these implementations without departing from the principles and spirit of the preceding detailed description. It is intended that the present disclosure be construed as including all such modifications and alterations insofar as they come within the scope of the appended claims or the equivalents thereof.

What is claimed is:

1. An organogel composition, comprising:
   a three-dimensional, cross-linked network of acrylates; and
   a liquid organic phase comprising one or more organic solvents disposed within the three-dimensional, cross-linked network; and
   one or more functional additives,
   wherein the acrylates comprise polybutadiene dimethyacrylate, pentaerythritol tetraacrylate, polyethylene glycol diacrylate, or a combination thereof.

2. The organogel composition of claim 1, wherein the acrylates comprise polybutadiene dimethyacrylate and pentaerythritol tetraacrylate.

3. The organogel composition of claim 1, wherein the one or more organic solvents comprise an aliphatic hydrocarbon, an aromatic compound, a ketone, an amine, an ester, an alcohol, an aldehyde, an ether, or combinations thereof.

4. The organogel composition of claim 3, wherein the one or more organic solvents comprise the ketone, and wherein the ketone comprises acetone, methyl ethyl ketone (MEK), diethyl ketone, methyl propyl ketone (MPK), dipropyl ketone, methyl isobutyl ketone (MIBK), cyclopentanone, cyclohexanone, methyl amyl ketone, N-methyl-2-pyrrolidone, diisobutyl ketone, acetophenone, or combinations thereof.

5. The organogel composition of claim 3, wherein the one or more organic solvents comprise the ester, and wherein the ester comprises ethyl acetate, n-butyl acetate, or combinations thereof.

6. The organogel composition of claim 1, wherein the one or more functional additives comprise an adhesion promoter, a visual indicator, an abrasive, a plasticizer, a surfactant, a flame retardant agent, a biocide, a cure promoter, a tackifier, an accelerant, or combinations thereof.

7. The organogel composition of claim 6, wherein the one or more functional additives comprise the adhesion promoter, and wherein the adhesion promoter comprises a compound including a reactive silane, a reactive titanate, a reactive zirconate, or combinations thereof.

8. The organogel composition of claim 6, wherein the one or more functional additives comprise the adhesion promoter.

9. The organogel composition of claim 6, wherein the one or more functional additives comprise the visual indicator, and wherein the visual indicator comprises a pigment, a dye, an ultraviolet indicator, or combinations thereof.

10. The organogel composition of claim 6, wherein the one or more functional additives comprise the visual indicator, and wherein the visual indicator absorbs energy in the ultraviolet spectrum, and wherein the visual indicator emits energy in the visible spectrum.

11. The organogel composition of claim 6, wherein the one or more functional additives comprise the visual indicator, and wherein the visual indicator is fluorescent or phosphorescent.

12. The organogel composition of claim 6, wherein the one or more functional additives comprise the abrasive, and wherein the abrasive comprises silica, alumina, silicates, talc, aluminosilicates, barium sulfate, mica, diatomite, calcium carbonate, calcium sulfate, carbon, wollastonite, or combinations thereof.

13. An organogel composition, comprising:
one or more organic solvents, wherein the one or more organic solvents comprise an aliphatic hydrocarbon, an aromatic compound, a ketone, an amine, an ester, an alcohol, an aldehyde, an ether, or combinations thereof;
one or more acrylates, wherein the one or more acrylates comprise polybutadiene dimethyacrylate, pentaerythritol tetraacrylate, polyethylene glycol diacrylate, or combinations thereof; and
one or more functional additives, wherein the one or more functional additives comprise an adhesion promoter, a visual indicator, an abrasive, a plasticizer, a surfactant, a flame retardant agent, a biocide, a cure promoter, a tackifier, an accelerant, or combinations thereof.

14. The organogel composition of claim 13, wherein the one or more organic solvents comprise the ketone, and wherein the ketone comprises acetone, methyl ethyl ketone (MEK), diethyl ketone, methyl propyl ketone (MPK), dipropyl ketone, methyl isobutyl ketone (MIBK), cyclopentanone, cyclohexanone, methyl amyl ketone, N-methyl-2-pyrrolidone, diisobutyl ketone, acetophenone, or combinations thereof.

15. The organogel composition of claim 13, wherein the one or more functional additives comprise the adhesion promoter, and wherein the adhesion promoter comprises a compound including a reactive silane, a reactive titanate, a reactive zirconate, or combinations thereof.

16. The organogel composition of claim 13, wherein the one or more functional additives comprise the visual indicator, and wherein the visual indicator is fluorescent or phosphorescent.

17. A method for preparing the organogel composition of claim 1, the method comprising:
contacting the three-dimensional, cross-linked network of acrylates, the liquid organic phase, and the one or more functional additives with one another to prepare the organogel composition; and
homogenizing the organogel composition.

18. The method of claim 17, wherein homogenizing the organogel composition modifies a shear viscosity of the organogel composition, and wherein homogenizing the organogel composition comprises shearing, dicing, mixing, or blending the organogel composition.

19. The method of claim 17, wherein homogenizing the organogel composition comprises blending the organogel composition in the presence of one or more glass or ceramic particles, and the method further comprises separating the one or more glass or ceramic particles from the organogel composition via filtration.

20. A method for preparing a surface for application of a sealant, the method comprising:
applying the organogel composition of claim 1 to the surface;
evaporating the organic solvents from the organogel composition; and
applying the sealant to the organogel composition.

* * * * *